United States Patent
Becker et al.

(10) Patent No.: US 10,553,325 B2
(45) Date of Patent: Feb. 4, 2020

(54) SCATTERED RADIATION GRID WITH AN AMORPHOUS MATERIAL AND ITS USE IN A SCATTERED RADIATION GRID

(71) Applicant: Siemens Healthcare GmbH, Erlangen (DE)

(72) Inventors: Rainer Becker, Erlangen (DE); Manfred Ruehrig, Lauf a.d. Pegnitz (DE)

(73) Assignee: Siemens Healthcare GmbH, Erlangen (DE)

( * ) Notice: Subject to any disclaimer, the term of this patent is extended or adjusted under 35 U.S.C. 154(b) by 184 days.

(21) Appl. No.: 15/854,946

(22) Filed: Dec. 27, 2017

(65) Prior Publication Data
US 2018/0204646 A1 Jul. 19, 2018

(30) Foreign Application Priority Data

Jan. 18, 2017 (DE) .................. 10 2017 200 762

(51) Int. Cl.
*G21K 1/10* (2006.01)
*B32B 15/04* (2006.01)

(52) U.S. Cl.
CPC ............... *G21K 1/10* (2013.01); *B32B 15/04* (2013.01); *B32B 2307/702* (2013.01)

(58) Field of Classification Search
CPC ...... G21K 1/10; B32B 15/04; B32B 2307/702
USPC ......................................... 378/154
See application file for complete search history.

(56) References Cited

U.S. PATENT DOCUMENTS

| | | | |
|---|---|---|---|
| 5,557,650 A * | 9/1996 | Guida ................ | G21K 1/025 378/147 |
| 6,980,629 B1 | 12/2005 | Hoheisel | |
| 2005/0111627 A1 | 5/2005 | Leppert | |
| 2009/0003530 A1 * | 1/2009 | Van Vroonhoven ... | G01N 23/04 378/154 |
| 2014/0284503 A1 | 9/2014 | Stevick | |

FOREIGN PATENT DOCUMENTS

| DE | 10241424 A1 | 3/2004 |
| DE | 10354808 A1 | 6/2005 |
| DE | 102013204269 A1 | 9/2014 |

OTHER PUBLICATIONS

German Office Action # 102017200762.1 dated Nov. 23, 2017.

* cited by examiner

*Primary Examiner* — Courtney D Thomas
(74) *Attorney, Agent, or Firm* — Harness, Dickey & Pierce, P.L.C.

(57) ABSTRACT

A scattered radiation grid for an x-ray imaging is disclosed. In an embodiment, the scattered radiation grid includes alternately arranged layers permeable to x-ray radiation and absorbing x-ray radiation. The layers absorbing the x-ray radiation are formed from an amorphous material. Further, a method is disclosed for using an amorphous metal for the layers of a scattered radiation grid absorbing the x-ray radiation.

15 Claims, 1 Drawing Sheet

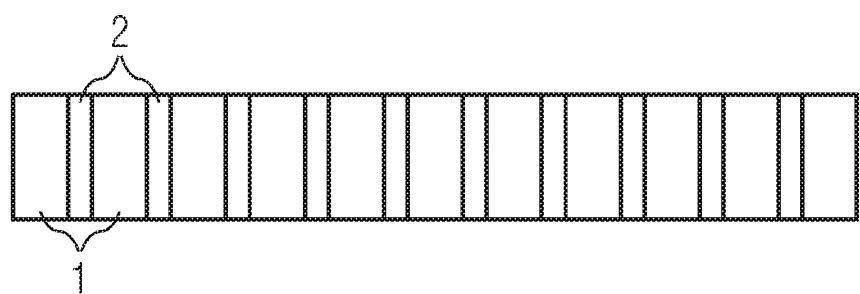

SCATTERED RADIATION GRID WITH AN AMORPHOUS MATERIAL AND ITS USE IN A SCATTERED RADIATION GRID

PRIORITY STATEMENT

The present application hereby claims priority under 35 U.S.C. § 119 to German patent application number DE 102017200762.1 filed Jan. 18, 2017, the entire contents of which are hereby incorporated herein by reference.

FIELD

At least one embodiment of the invention generally relates to a scattered radiation grid (abbreviated to: grid) for the x-ray imaging and/or the use of an amorphous metal for a scattered radiation grid.

BACKGROUND

Heavy demands are placed on the image quality of x-ray recordings in x-ray image technology. For this type of recording, in particular as performed in medical x-ray diagnostics, an object to be examined is irradiated by x-ray radiation from a virtually punctiform x-ray source. The attenuation distribution of the x-ray radiation on the side of the object opposite the x-ray source is captured in two dimensions. The x-ray radiation attenuated by the object can also be captured line by line, for example in computed tomography systems.

Flat-panel detectors are increasingly used as x-ray detectors in addition to x-ray films and gas detectors, and generally have a matrix-shaped arrangement of opto-electronic semiconductor components as photoelectric receivers. Each pixel of the x-ray recording should ideally correspond to the attenuation of the x-ray radiation through the object on a straight-line axis from the punctiform x-ray source to the location on the detector surface corresponding to the pixel. X-rays that hit the x-ray detector in a straight line from the punctiform x-ray source on this axis are known as primary rays.

The x-ray radiation emitted from the x-ray source is however scattered in the object because of unavoidable interactions, so that scattered rays also hit the detector in addition to the primary rays. These scattered rays, which as a function of properties of the object can cause more than 90% of the entire signal modulation of an x-ray detector in diagnostic images, represent a noise source and make fine differences in contrast harder to identify.

Hence to reduce the proportion of scattered radiation hitting the detectors, what are known as scattered radiation grids are inserted between the object and the detector. Scattered radiation grids consist of regularly arranged structures that absorb x-ray radiation, between which through-channels or through-slots are formed to enable the primary radiation to pass through with as little attenuation as possible. These through-channels or through-slots are aligned toward the focus in the case of focused scattered radiation grids in accordance with the distance from the punctiform x-ray source, i.e. the distance from the focus of the x-ray tube. In the case of unfocused scattered radiation grids the through-channels or through-slots are aligned across the whole surface of the scattered radiation grid vertically to the surface thereof. However, this results in a marked loss of primary radiation at the edges of the image recording, as a larger proportion of the incident primary radiation hits the absorbent regions of the scattered radiation grid at these points.

To achieve an optimal image quality very high demands are placed on the properties of x-ray scattered radiation grids. The scattered rays should on the one hand be absorbed as much as possible, while on the other hand as high a proportion as possible of primary radiation should pass through the scattered radiation grid unattenuated. A diminution of the proportion of scattered radiation hitting the detector surface can be achieved inter alia using a large ratio of the height of the scattered radiation grid to the thickness or the diameter of the through-channels or through slots, i.e. using a high grid ratio, also known as aspect ratio.

There are various techniques and corresponding embodiments for producing scattered radiation grids for x-ray radiation. Thus for example publication DE 102 41 424 A1 describes various production methods and embodiments of scattered radiation grids. For example, lamellar scattered radiation grids are known which are made up of strips of lead and paper. The lead strips serve to absorb the secondary radiation, while the paper strips disposed between the lead strips form the through-slots for the primary radiation. Alternatively aluminum can also be used instead of paper, thereby reducing the costs of the production process. The paper grid uses paper with a low attenuation as a slit or window. The aluminum grid uses aluminum as a slit or window, which has a significantly higher attenuation compared to paper.

With the production of scattered radiation grids with lead films in the form of tapes, experience has shown that this frequently results in material-specific defects, which cause a high error rate or require particularly complicated measures to reduce the error rate. Defects at the cut tape edges are known, since the lead films are very soft and sensitive. Furthermore, tapes may become torn off due to the low mechanical solidity. Faults (cavities, holes) occur in the tape material, particularly when the band thickness is <25 µm. All these defects immediately cause the x-ray image or image artifacts to deteriorate, since the scattered radiation grid is positioned directly in the radiation path (between the patient and image recording system).

In order to protect the sensitive edges of the lead tape from a mechanical load (e.g. when unwinding or winding during the lining with carrier paper), the thin lead tape is inserted into a width which is almost twice as large as is subsequently required in the scattered radiation grid. The lead tape is only cut to the required width immediately before placing the tapes into the grid frames. The overhang is a decrease in production and must be disposed of.

Lead tape is lined with paper in order to produce the scattered radiation grid. The paper serves on the one hand as a carrier for the lead tape and on the other hand has the function of bringing the lead tapes to the required distance so that x-rays can pass almost unhindered between the lead tapes. What is known as the aspect ratio results from the width of the lead tapes, the tape planes of which are aligned in the direction of the focal point of the x-ray tubes, and the thickness of the paper layers, including adhesive thickness, disposed therebetween. The aspect ratio refers to the ratio of gap width to height in the grid.

SUMMARY

At least one embodiment of the invention specifies a scattered radiation grid and/or a use in a scattered radiation grid, which represent an improvement compared with known embodiments.

According to at least one embodiment of the invention, the scattered radiation grid is used. Advantageous developments are specified in the claims.

At least one embodiment of the invention is directed to a scattered radiation grid for an x-ray imaging, having layers which are permeable to alternately arranged x-ray radiation and absorb x-ray radiation, wherein the layers absorbing the x-ray radiation are formed from an amorphous material.

At least one embodiment of the invention is directed to a method comprising using an amorphous metal, for the layers of a scattered radiation grid which absorb the x-ray radiation; and producing the scattered radiation grid using the amorphous metal.

At least one embodiment of the invention is directed to a method comprising producing a scattered radiation grid using an amorphous metal for layers of the scattered radiation grid to absorb x-ray radiation.

Further specific features and advantages of the invention will become apparent from the following explanations of an example embodiment with reference to the schematic drawing.

BRIEF DESCRIPTION OF THE DRAWINGS

The drawing shows a scattered radiation grid with alternately stacked layers 1, 2 permeable to x-ray radiation and absorbing x-ray radiation. The layer 2 absorbing x-ray radiation consists of an amorphous metal and the layer permeable to x-ray radiation which is made from paper and an adhesive.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the FIGURES. It will be understood that the spatially relative terms are intended to encompass different orientations of the device in use or operation in addition to the orientation depicted in the FIGURES. For example, if the device in the FIGURES is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the FIGURES. For example, two FIGURES shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the FIGURE. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The drawing shows a scattered radiation grid with alternately stacked layers 1, 2 permeable to x-ray radiation and absorbing x-ray radiation. The layer 2 absorbing x-ray radiation consists of an amorphous metal and the layer permeable to x-ray radiation which is made from paper and an adhesive.

In accordance with at least one embodiment of the invention, a thin film (tape) made from amorphous material, more precisely a metallic glass, is used as absorbent material instead of the lead tape. Amorphous materials of this type are alloys made from metals with non-metals. In such cases the integration of the generally small movable non-metal atoms (known as metalloids) between the metal atoms brings about an unordered "glass-type amorphous" structure.

A rapid cooling from the molten mass of the alloys additionally assists with the formation of the amorphous structure. Metallic glasses with a high density and with alloy components with a high atomic number (e.g. Pb, W, Mo etc.) are particularly effective. Metallic glasses in a tape form, such as can be produced for instance by the rapid solidification on a rotating copper roller, are particularly advantageous for use in scattered radiation grids.

At least one embodiment of the invention takes advantage of the fact that amorphous metals are able to be produced relatively easily as thin tapes (thickness: 15-25 µm], wherein the x-ray absorption can be optimized by means of suitable alloy components (e.g. W, Mo, P, Pt) and due to their amorphous microstructure the materials have excellent mechanical properties with respect to hardness, E-module and tensile strength.

In particular, the combination of these properties renders the amorphous material a suitable material for use in scattered radiation grids with high line densities (tape thicknesses<20 µm). The tapes can be produced as coiled rollers in tape lengths of up to 2000 m. They have few to no defects. Short-wave thickness fluctuations are very small, and allow the tapes to be easily mechanically processed with suitable tools (for instance roller shears). The tapes have high tensile strength and are comparably insensitive to mechanical loads.

Imperfections (splices, thickness irregularities, holes) are only tolerable to an extremely limited degree in a scattered radiation grid, since they would be visible in the x-ray image and could result in misinterpretations in the medical findings report. The mechanical quality of the absorber material used is therefore of crucial importance to the production of scattered radiation grids. Faults are often only detected with a subsequent quality control, wherein the scattered radiation grids are penetrated with x-rays. With a 100% control, image artifacts are sought. Faulty parts are rejected and cannot be repaired. Since lead tapes are naturally very soft, they also respond sensitively to mechanical stress, such as buckling, pulling etc.

At least one embodiment of the invention is directed to a scattered radiation grid for an x-ray imaging, having layers which are permeable to alternately arranged x-ray radiation and absorb x-ray radiation, wherein the layers absorbing the x-ray radiation are formed from an amorphous material.

In one development, the amorphous material is an amorphous metal. Amorphous metals (also referred to as metallic glasses) are metal or metal and non-metal alloys, which at the atomic level do not have a crystalline structure, but instead an amorphous structure and still indicate metallic conductivity. The amorphous atom arrangement which is very unusual for metals gives rise to a unique combination of physical properties: metallic glasses are generally harder, more corrosion-resistant and stronger than conventional metals. The deformability which is characteristic of most metals is however usually missing.

In a further embodiment, the amorphous metal is wolfram, bismuth, molybdenum, lead or platinum, an alloy therefrom or an alloy with other metals and/or non-metals.

In a further design, the amorphous material is embodied as a tape film.

In one development, the x-ray radiation is formed from a permeable layer made from paper.

At least one embodiment of the invention is directed to a method comprising using an amorphous metal for the layers of a scattered radiation grid which absorb the x-ray radiation when producing a scattered radiation grid.

Although the invention has been illustrated and described in detail by the preferred example embodiments, the invention is not restricted by the examples given and other variations can be derived therefrom by a person skilled in the art without departing from the protective scope of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE CHARACTERS

1 Layer permeable to x-ray radiation
2 Layer absorbing x-ray radiation

What is claimed is:

1. A scattered radiation grid for an x-ray imaging apparatus, the scattered radiation grid comprising:
    a plurality of layers permeable to x-ray radiation; and
    a plurality of layers to absorb x-ray radiation, respective layers among the plurality of layers permeable to x-ray radiation being alternately arranged with respective layers among the plurality of layers to absorb x-ray radiation, the plurality of layers to absorb ray radiation being formed from an amorphous material; wherein
    the amorphous material is an amorphous metal, and
    the amorphous metal is a metallic glass.

2. The scattered radiation grid of claim 1, wherein the amorphous metal is an alloy made from at least one of wolfram, bismuth, molybdenum, lead or platinum with other metals, and non-metals.

3. The scattered radiation grid of claim 2, wherein at least one of the plurality of layers permeable to x-ray radiation is formed from paper.

4. The scattered radiation grid of claim 1, wherein the amorphous material is embodied as a tape film.

5. The scattered radiation grid of claim 1, wherein at least one of the plurality of layers permeable to x-ray radiation is formed from paper.

6. The scattered radiation grid of claim 5, wherein the amorphous material is embodied as a tape film.

7. The scattered radiation grid of claim 1, wherein the metallic glass is embodied as a tape film having a thickness less than or equal to 25 μm.

8. A method, comprising:
    producing a scattered radiation grid using an amorphous metal for layers of the scattered radiation grid to absorb x-ray radiation, the amorphous metal being a metallic glass.

9. The method of claim 8, wherein the amorphous metal is an alloy made from at least one of wolfram, bismuth, molybdenum, lead or platinum with other metals, and non-metals.

10. The method of claim 8, wherein the amorphous metal is embodied as a tape film.

11. The method of claim 8, wherein the metallic glass is formed as a tape film having a thickness less than or equal to 25 μm.

12. A method, comprising:
  using an amorphous metal for layers of a scattered radiation grid, which absorbs x-ray radiation, the amorphous metal being a metallic glass; and
  producing the scattered radiation grid using the amorphous metal.

13. The method of claim 12, wherein the amorphous metal is an alloy made from at least one of wolfram, bismuth, molybdenum, lead or platinum with other metals, and non-metals.

14. The method of claim 12, wherein the amorphous metal is embodied as a tape film.

15. The method of claim 12, wherein the metallic glass is formed as a tape film having a thickness less than or equal to 25 μm.

* * * * *